US006874104B1

(12) United States Patent
Josten et al.

(10) Patent No.: US 6,874,104 B1
(45) Date of Patent: Mar. 29, 2005

(54) ASSIGNING RECOVERABLE UNIQUE SEQUENCE NUMBERS IN A TRANSACTION PROCESSING SYSTEM

(75) Inventors: Jeffrey William Josten, San Jose, CA (US); Chandrasekaran Mohan, San Jose, CA (US); Inderpal Singh Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 09/330,865

(22) Filed: Jun. 11, 1999

(51) Int. Cl.[7] ............................................... G06F 11/00
(52) U.S. Cl. ............................ 714/15; 714/18; 714/20; 707/202
(58) Field of Search .............................. 714/15, 20, 18; 707/202

(56) References Cited

U.S. PATENT DOCUMENTS

| | | | | |
|---|---|---|---|---|
| 3,736,566 | A | * 5/1973 | Anderson et al. | 712/228 |
| 5,043,866 | A | * 8/1991 | Myre et al. | 707/202 |
| 5,220,665 | A | 6/1993 | Coyle, Jr. et al. | |
| 5,327,556 | A | * 7/1994 | Mohan et al. | 707/203 |
| 5,371,886 | A | 12/1994 | Britton et al. | |
| 5,495,590 | A | * 2/1996 | Comfort et al. | 712/228 |
| 5,504,899 | A | 4/1996 | Raz | |
| 5,504,900 | A | 4/1996 | Raz | |
| 5,581,750 | A | 12/1996 | Haderle et al. | |
| 5,590,318 | A | * 12/1996 | Zbikowski et al. | 707/202 |
| 5,636,360 | A | * 6/1997 | Courts et al. | 710/200 |
| 5,701,480 | A | 12/1997 | Raz | |
| 5,734,898 | A | 3/1998 | He | |
| 5,832,203 | A | * 11/1998 | Putzolu et al. | 714/16 |
| 5,862,318 | A | 1/1999 | Habben | |
| 6,131,094 | A | * 10/2000 | Gord | 707/10 |

FOREIGN PATENT DOCUMENTS

| | | |
|---|---|---|
| JP | 55-091037 | 7/1980 |
| JP | 02-230343 | 9/1990 |
| JP | 03-098128 | 4/1991 |
| JP | 03-266161 | 11/1991 |
| JP | 07-084953 | 3/1995 |
| JP | 08-036547 | 2/1996 |

OTHER PUBLICATIONS

Youngkon Lee et al., "Commit–order Oriented Validation Scheme for Transaction Scheduling in Mobile Distributed Database Systems: COOV.", IEICE Transactions on Information and Systems, vol. E80–D, No. 1 (pp 10–14), Jan. 1997 (1 page Abstract only).

Kwok Wa Lam et al., "Optimistic Concurrency Control Protocol for Real–time Databases", Journal of Systems and Sofware, vol. 38, No. 2, pp. 119–131, Aug. 1997, (1 page Abstract only).

Youngkon Lee et al., "Commit–reordering Validation Scheme for Transaction Scheduling in Client–server Based Teleputing Systems: COREV." Korea Adv. Inst. of Sci. & Technology, Seoul, South Korea: Proceedings of the 6th International Conference on Information and Knowledge Management, CIKM '97, pp. 59–66, Published: New York, NY, USA, 1997, (1 page Abstract only).

* cited by examiner

*Primary Examiner*—Robert Beausoliel
*Assistant Examiner*—Michael C. Maskulinski
(74) *Attorney, Agent, or Firm*—Gates & Cooper LLP

(57) ABSTRACT

A method, apparatus, article of manufacture, and data structure for use in providing transaction control for a computer-implemented database management system. The database management system manages one or more databases. A transaction processing system provides transaction control for one or more of the databases managed by the database management system, wherein the transaction processing system assigns a recoverable, unique sequence number whenever a request is made by an application.

73 Claims, 8 Drawing Sheets

ASSIGNING RECOVERABLE UNIQUE SEQUENCE NUMBERS IN A TRANSACTION PROCESSING SYSTEM

BACKGROUND OF THE INVENTION

1. Field of the Invention

The present invention generally relates to computer-implemented database management systems, and in particular, to a method for assigning recoverable, unique sequence numbers in a transaction processing system.

2. Description of Related Art

Transaction control is well understood in the art and is often used to guarantee the integrity of enterprise databases. Guaranteeing the integrity of databases in the face of concurrent execution of multiple transactions and various failures is a very important issue with enterprise databases. Indeed, many methods have been developed in the past to deal with these problems for enterprise databases.

Transaction processing systems usually assign a unique sequence number (SN) to transactions, log file records, fields, etc. Generally, the SNs comprise values assigned a monotonically increasing value in an ascending sequence, although they can encompass other values and sequences as well.

A problem arises, however, in that the sequence number assignment to a transaction is an update operation to a record which is locked until transaction commit. This serializes other transactions because they wait for the updated record to be unlocked in order to receive their sequence number assignment. In a multi-system transaction processing system, e.g., where there is data sharing, an update of this record causes serialization across all systems, which inhibits transaction throughput.

Thus, there is a need in the art for enhanced transaction control for databases. Specifically, there is a need in the art for improved techniques for assigning sequence numbers without serialization.

SUMMARY OF THE INVENTION

To overcome the limitations in the prior art described above, and to overcome other limitations that will become apparent upon reading and understanding the present specification, the present invention discloses a method, apparatus, article of manufacture, and data structure for use in providing a recoverable, unique sequence number.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a method that efficiently assigns recoverable, unique, monotonically-increasing sequential numbers. Such sequence numbers are often used in transaction processing systems, as described herein, but they can also be used for database management systems, and other applications.

With regard to efficiency, the present invention implies: (a) a unique sequence number can be assigned to multiple applications or transactions executing concurrently, i.e., without waiting for other applications or transactions (which have been assigned sequence numbers) to commit, and (b) with minimal path length.

With regard to recoverability, the present invention implies that the sequence number is guaranteed to be increasing across failures (but may have a gap after a failure occurs).

Hardware Environment

Figure 1:
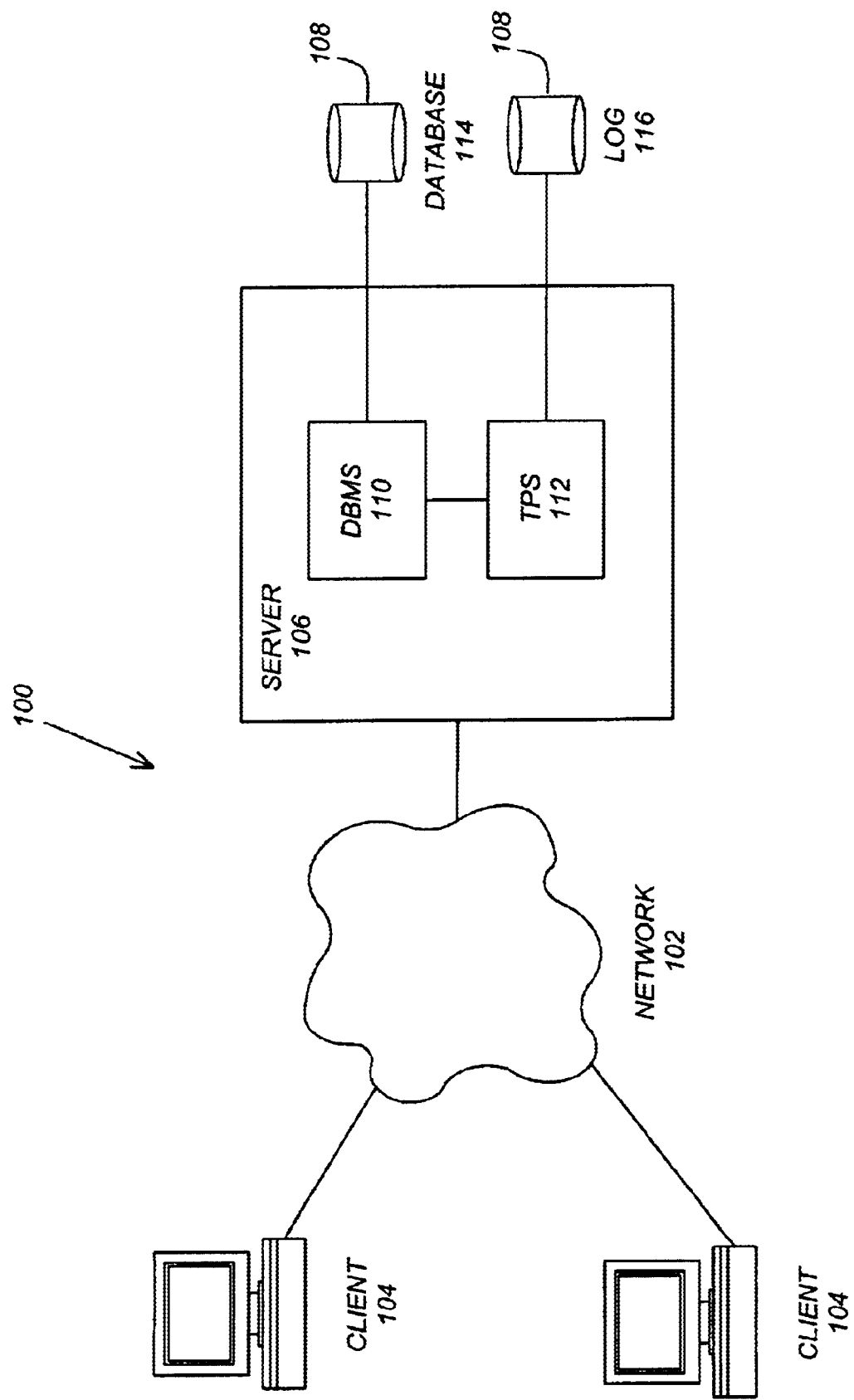
FIG. 1 schematically illustrates the environment of the preferred embodiment of the present invention.

FIG. 1 schematically illustrates the environment of the preferred embodiment of the present invention, and more particularly, illustrates a typical distributed computer system 100 using a network 102 to connect one or more clients 104 to a server 106 having one or more direct access storage devices (DASDs) 108. The network 102 may comprise networks such as LANs, WANs, SNA networks, and the Internet. A typical combination of resources may include clients 104 that are implemented on personal computers or workstations, and servers 106 that are implemented on personal computers, workstations, minicomputers, or mainframes.

In a preferred embodiment, the server 106 executes a Database Management System DBMS) 110 and a Transaction Processing System (TPS) 112, and the DASD 108 stores one or more databases 114 and one or more transaction logs 116. Generally, the DBMS 110, TPS 112, databases 114, and transaction logs 116 are embodied in and/or readable from devices, carriers, or media, such as a memories, data storage devices, and/or remote devices coupled to the computer via data communications devices.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality.

Of course, those skilled in the art will recognize many modifications may be made to this configuration without departing from the scope of the present invention. In addition, those skilled in the art will recognize that any combination of the above components, or any number of different components, including different computers, computer programs, peripherals, and other devices, may be used to implement the present invention, so long as similar functions are performed thereby.

Transaction Processing System

To meet data recovery requirements, the TPS 112 records the progress of a transaction being performed by the DBMS 112 in the log 116, and the actions of the transaction that cause modifications to recoverable database 114 records. The log 116 can be thought of as an ever-growing sequential file. The log 116 becomes the source of ensuring either that the transaction's committed actions are reflected in the associated database 114 in spite of various types of failures, or that its uncommitted actions are undone (i.e., rolled back). When the logged actions reflect a database 114 record's content, then those log 116 records also become the source for reconstruction of damaged or lost databases 114.

The preferred embodiment uses a write-ahead logging (WAL) approach to recovery, although other approaches may be used without departing from the scope of the present invention. The WAL approach asserts that the log 116 records representing modifications to database 114 records must be stored on DASD 108 before the modified database 114 records are allowed to replace the previous version of those database 114 records on the DASD 108. Additionally, transaction status is stored in the log 116 and no transaction can be considered complete until its committed status and all its log 116 records are safely recorded on the DASD 108.

Transaction Logging

Transaction logging is performed by the TPS 112 for every modification made by a transaction to a database 114 record. More specifically, a transaction is not allowed to modify the database 114 records on the DASD 108 until at least an "undo" portion of a corresponding log 116 record has been written to the log 116. In addition, the transaction is not permitted to complete its commit processing until at least a "redo" portion of a corresponding log 116 record has been written to the log 116. These requirements allow a restart recovery method performed by the TPS 112 to recover any transactions that completed successfully, but did not store their modified database 114 records on the DASD 108 prior to the failure.

For simplicity, it is assumed in the preferred embodiment that each log 116 record describes the modifications performed to only a single database 114 record, although alternative embodiments may make other assumptions. The redo portion of a log 116 record provides information on how to redo modifications performed by the transaction and the undo portion of a log 116 record provides information on how to undo modifications performed by the transaction.

Depending on the action performed, the redo/undo information may be recorded physically (e.g., before and after images of specific fields within the database 114 record) or operationally (e.g., add 5 to field 3 of the database 114 record). Operational logging permits high concurrency lock modes, which exploit the semantics of the operation performed on the database 114 record (e.g., the same field of a database 114 record could have uncommitted modifications from multiple transactions). These permit more concurrency than what is permitted by the strict executions property, which essentially requires that modified database 114 records be locked for the commit duration.

During the restart recovery method, when the redo log 116 record for such a modification is encountered, if the database 114 record is an earlier version than that reflected in the log 116 record, then the TPS 112 will need to apply this log 116 record. At this point, the log 116 record should have the "old image" for this database 114 record. To perform the redo pass, the TPS 112 builds an in-memory version of the items for the database 114 record, by extracting the modified/ inserted items from the log 116 record and unchanged items for their "old" positions in the database 114 record. At this point, the TPS 112 can store the reconstructed database 114 record on the DASD 108. The undo pass is handled in a similar fashion.

The log 116 is usually stored on a stable, non-volatile, data storage device, for example, DASD 108, although other devices could also be used. Whenever log 116 records are created, they are first stored in buffers of the TPS 112 before being written to the log 116 on the DASD 108. Only at certain times (e.g., at commit time) are the log 116 records written (in sequence) to the DASD 108. This is called "forcing" the log 116 records. In addition to forces caused by transaction and TPS 112 activities, a background process may periodically force the log 116 records as buffer space in the TPS 112 is exhausted.

Each log 116 record is assigned a sequence number at the time the log 116 record is written to the DASD 108. These sequence numbers are described in more detail below.

Sequence Numbers

In the preferred embodiment, sequence numbers (SNs) comprise 8 byte values assigned in ascending sequence, although they can encompass any number of different values without departing from the scope of the present invention. The SN is usually (but not always) a monotonically increasing value.

Figure 2:
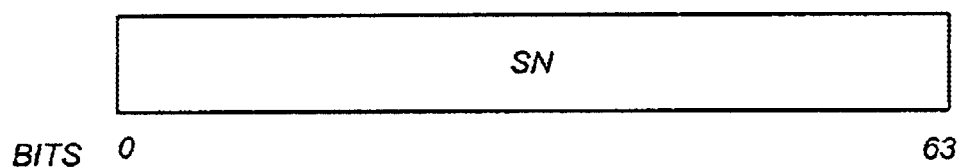
FIG. 2 illustrates the structure of an SN_Word according to the preferred embodiment of the present invention.

FIG. 2 illustrates the structure of an SN_Word 200 according to the preferred embodiment of the present invention. The SN_Word 200 is a shared data structure that is stored in a common area in the memory of the server 106. The SN_Word 200 stores the highest assigned SN maintained by the TPS 112. Periodically, the SN_Word 200 is checkpointed to the DASD 108, in order to effect a "hardening" of the SN.

This checkpointing requires: (a) allocation of a data set on the DASD 108 or other non-volatile data storage device, and (b) a protected environment to perform write operations to the data set. A protected environment means that a checkpoint write operation cannot be cancelled by canceling a transaction, thereby leaving the results of the checkpoint write operation unpredictable and affecting other transactions.

The SN is assigned by updating the SN_Word using a Compare Double and Swap (CDS) or Compare and Swap (CS) instruction (or similar logic), wherein the CDS/CS instruction atomically reads the SN_Word and then increments the SN_Word. After the SN has been assigned N times, a checkpoint of the SN_Word is initiated to harden the SN on the DASD 108. However, new SNs can continue to be assigned while this checkpoint I/O operation is in progress. Since the SN is critical to the operation of the application, the checkpoint may be duplexed for reliability.

The value stored in N is the number of SN assignments that can be made between consecutive checkpoints of the latest SN. N is maintained in memory and can be initially derived internally by the DBMS 110 or the TPS 112, or it can be derived from a user-specified value. Once N is initialized for the first time, it is thereafter initialized from the checkpoint record.

Figure 3:
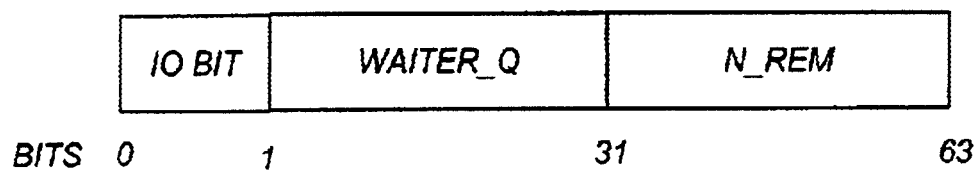
FIG. 3 illustrates the structure of an N_Word according to the preferred embodiment of the present invention.

FIG. 3 illustrates the structure of an N_Word 300 according to the preferred embodiment of the present invention.

Like the SN_Word 200, the N_Word 300 is a shared data structure stored in a common area in the memory of the server 106, and has the following format: (a) an 1-bit IO_BIT field indicating whether a checkpoint I/O operation is underway; (b) a 31-bit WAITER_Q identifier for identifying a queue for use in suspending transactions while waiting for a checkpoint write operation to complete; and (c) a 32-bit N_REM value that identifies an "N Remaining" value that indicates when a checkpoint write operation should be performed. Like the SN_Word, the N_Word is updated using a Compare and Swap (CS) instruction or Compare Double and Swap (CDS) instruction (or similar logic).

The N value is self adjusting. If the checkpoint write operation has not completed when it is time to perform the next checkpoint, the transaction attempting to assign a SN is suspended and queued until the checkpoint write operation has completed and the N value is adjusted to some higher value (e.g., 2*N) for subsequent checkpoints.

Logic for Assigning Sequence Numbers

The following flowcharts describes the processing and logic of initializing, assigning and hardening the SNs. This logic is referred to as the NUMA (NUMber Assignment) logic.

Initialization

Figure 4:
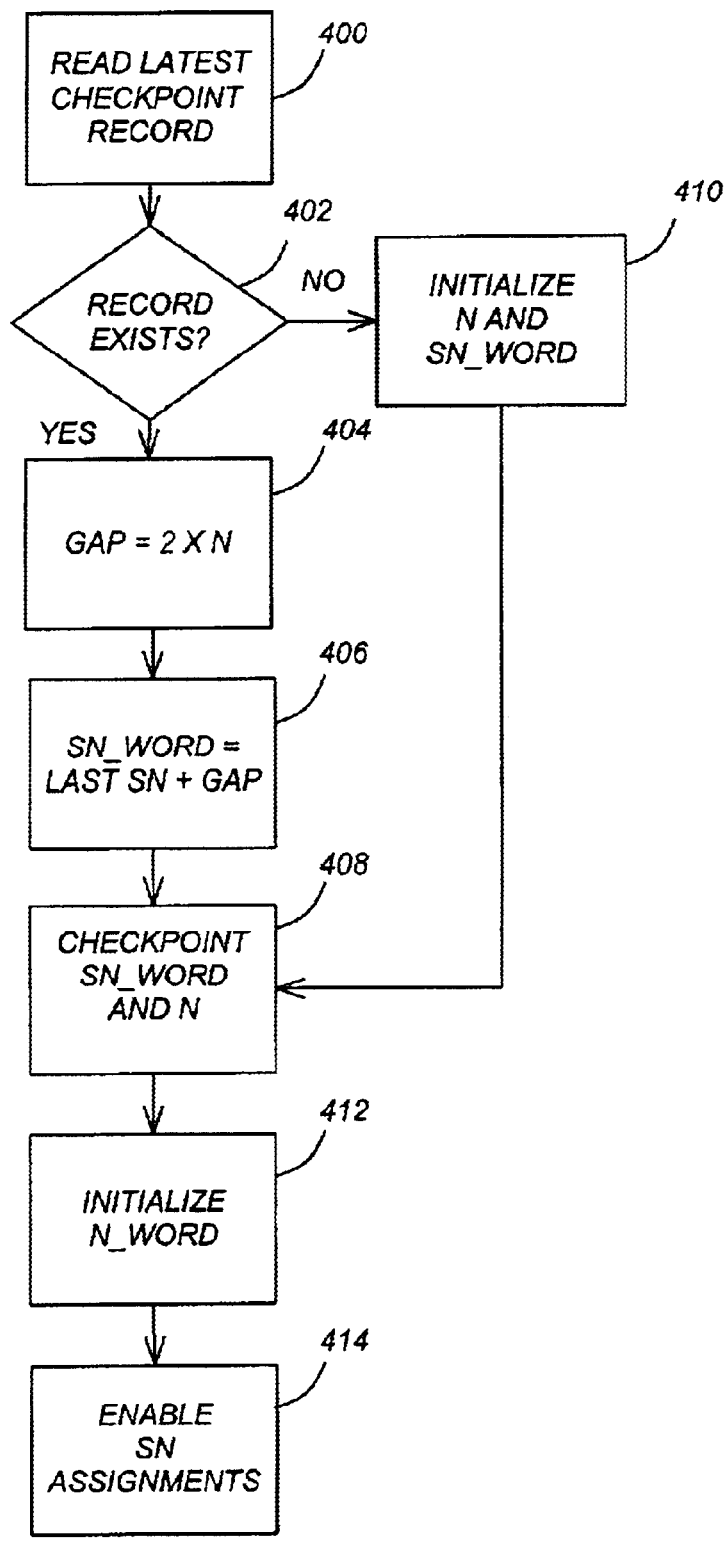
FIG. 4 is a flowchart that illustrates the logic performed during initialization according to the preferred embodiment of the present invention.

FIG. 4 is a flowchart that illustrates the logic performed during initialization. Generally, this initialization is performed during a restart of the TPS 112. Alternatively, this initialization can be performed any time before applications begin requesting assignment of sequence numbers.

Block 400 represents the TPS 112 reading the latest checkpoint record stored on DASD 108.

Block 402 is a decision block that represents the TPS 112 determining whether the checkpoint record exists. If so, control transfers to Block 404; otherwise, control transfers to Block 412.

Block 404 represents the TPS 112 calculating the value Gap=2*N, wherein N is read from the checkpoint record. The Gap value uses 2*N rather than N for the following reasons. When a checkpoint write operation is initiated, the process of SN assignment is not blocked. N is re-initialized in the N_Word and SN assignment continues. Therefore, during a failure, the logic may be behind the checkpoint write completion that was initiated after N and another N values may be used during the write operation.

Block 406 represents the TPS 112 calculating SN_Word= Last Checkpointed SN+Gap.

Block 408 represents the TPS 112 checkpointing the SN_Word and N.

Block 410 represents the TPS 112 initializing the SN_Word and N, wherein a first initialization of SN_Word and N may be user-specified (e.g., SN=0, N=20).

Block 412 represents the TPS 112 initializing the N_Word as shown in FIG. 4, wherein IO_BIT=0, WAITER_Q=0, and N_REM is set to the last checkpointed N value.

Block 414 represents the TPS 112 enabling assignment of SNs for transactions.

Sequence Number Assignment

FIGS. 5A, 5B, 5C, and 5D together are a flowchart that illustrates the logic performed during assignment of the SN to a transaction.

Figure 5A:
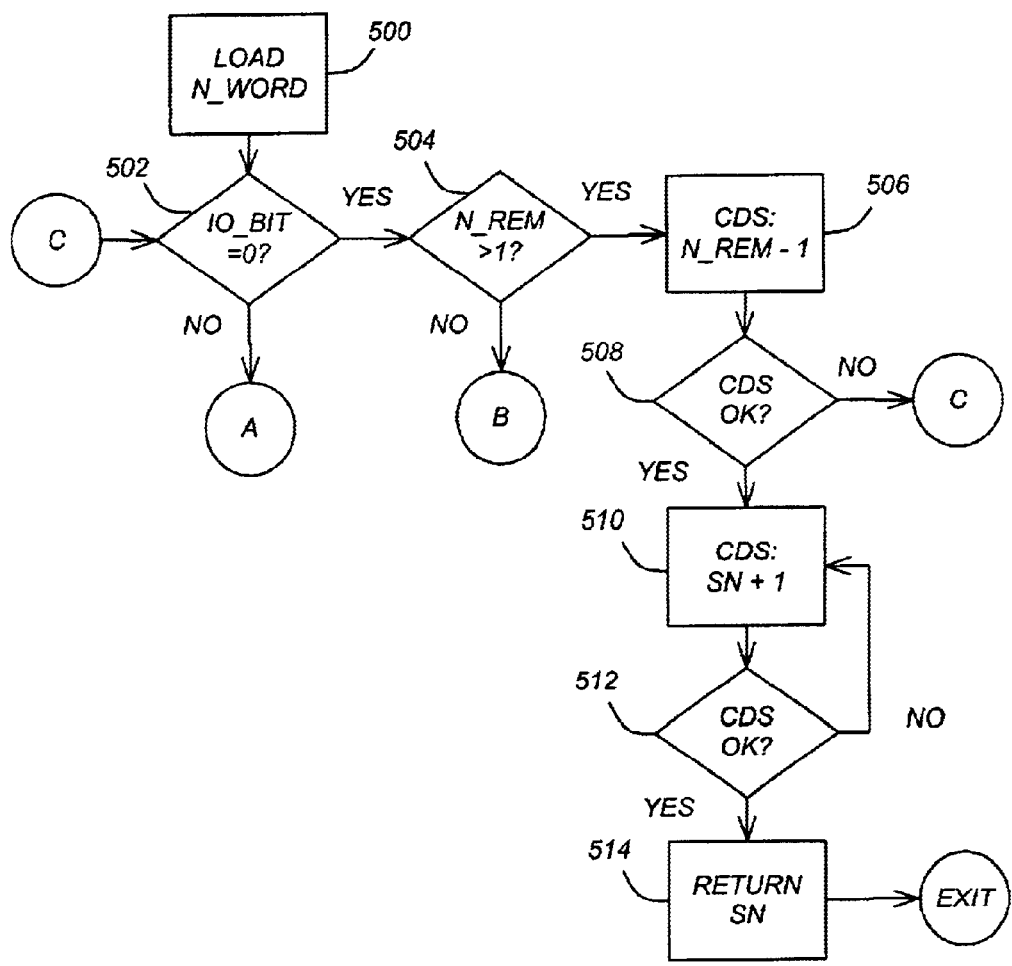
FIGS. 5A, 5B, 5C, and 5D together are a flowchart that illustrates the logic performed during assignment of a sequence number to a transaction according to the preferred embodiment of the present invention.

Referring to FIG. 5A, Block 500 represents the TPS 112 loading the N_Word into registers.

Block 502 is a decision block that represents the TPS 112 determining whether IO_BIT=0. If so, control transfers to Block 504; otherwise, control transfers to FIG. 5C via "A".

Block 504 is a decision block that represents the TPS 112 determining whether N_REM>1. This indicates that a checkpoint write operation is not in progress and it is not time to initiate a checkpoint write operation. If so, control transfers to Block 506; otherwise, control transfers to FIG. 5B via "B".

Block 506 represents the TPS 112 issuing the CDS instruction to subtract 1 from N_REM.

Block 508 is a decision block that represents the TPS 112 determining whether the CDS instruction succeeded. If so, control transfers to Block 510; otherwise, control transfers to Block 502 via "C".

Block 510 represents the TPS 112 issuing the CDS instruction to add 1 to the SN.

Block 512 is a decision block that represents the TPS 112 determining whether the CDS instruction succeeded. If so, control transfers to Block 514; otherwise, control returns to Block 510.

Block 514 represents the TPS 112 returning the SN to the requesting application.

Thereafter, the logic terminates.

Figure 5B:
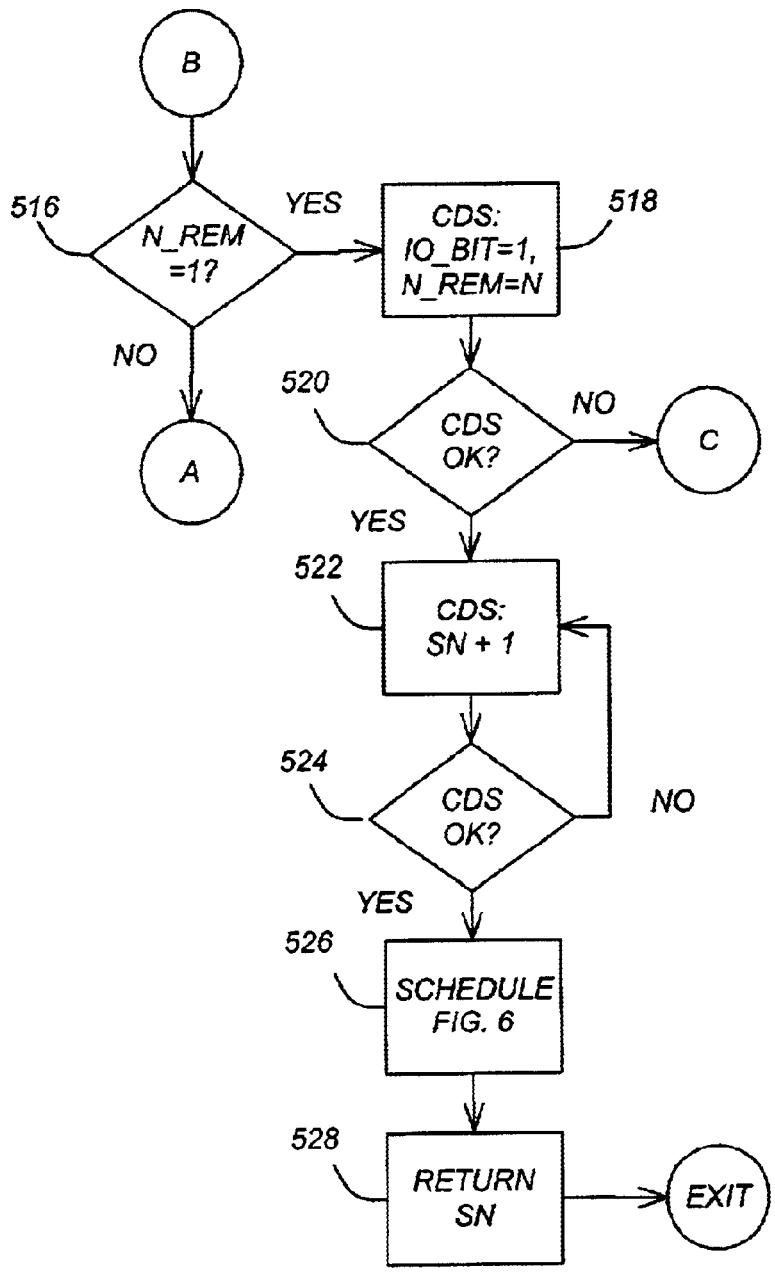

Referring now to FIG. 5B, which is entered via "B", Block 516 is a decision block that represents the TPS 112 determining whether N_REM=1. This indicates that a checkpoint write operation is not in progress and it is time to initiate a checkpoint write operation. If so, control transfers to Block 518; otherwise, control transfers to FIG. 5C via "A".

Block 518 represents TPS 112 issuing a CDS instruction with IO_BIT=1, and N_REM=N.

Block 520 is a decision block that represents the TPS 112 determining whether the CDS instruction succeeded. If so, control transfers to Block 522; otherwise, control transfers to Block 502 via "C".

Block 522 represents the TPS 112 issuing the CDS instruction to add 1 to the SN.

Block 524 is a decision block that represents the TPS 112 determining whether the CDS instruction succeeded. If so, control transfers to Block 526; otherwise, control returns to Block 522.

Figure 6:
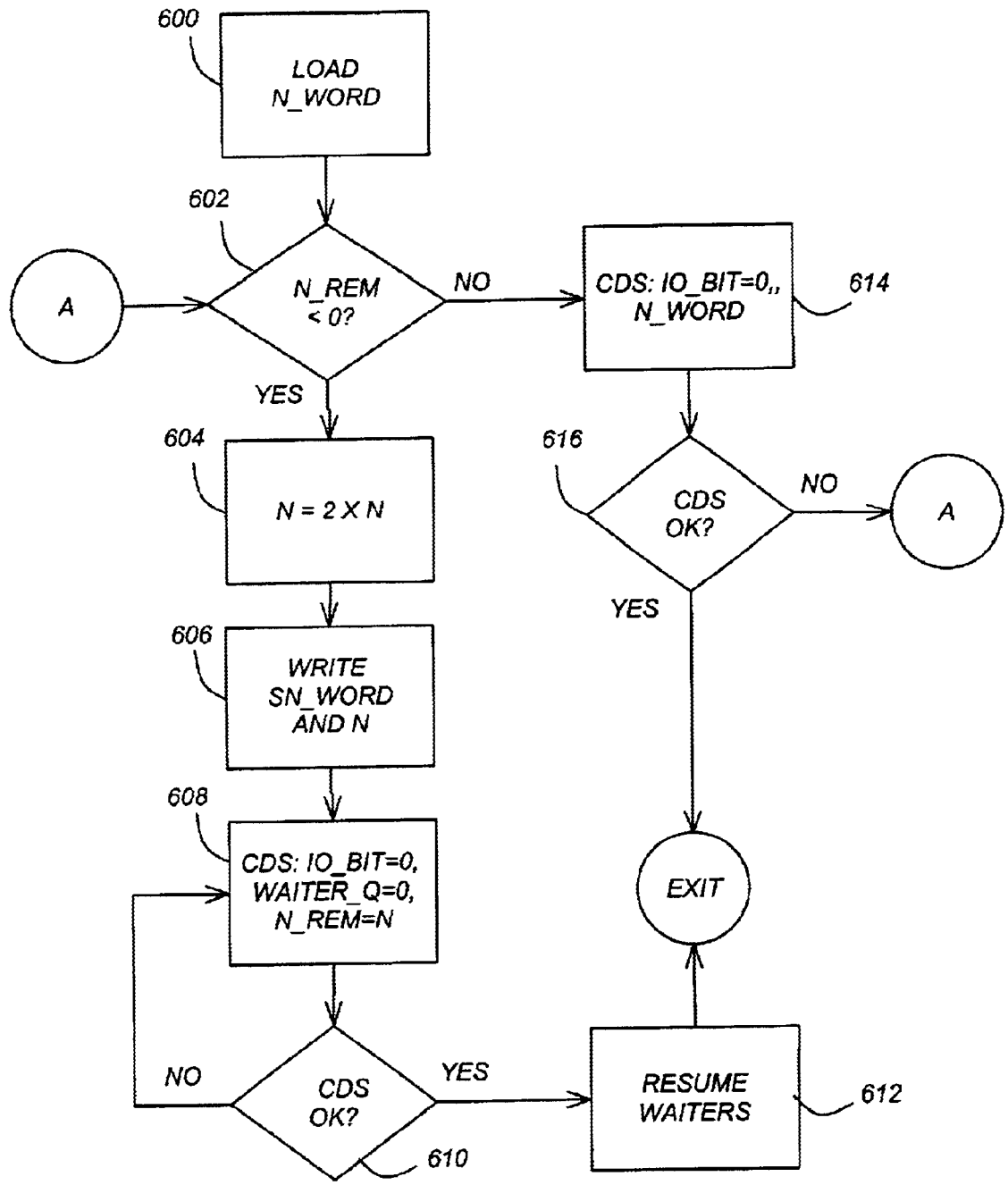
FIG. 6 is a flowchart that illustrates the logic performed during write input/output completions according to the preferred embodiment of the present invention.

Block 526 represents the TPS 112 triggering the logic described in FIG. 6, in order to schedule an asynchronous checkpoint write operation to harden the SN. The checkpoint write operation executes asynchronously under a separate execution unit, and the invoking process, after scheduling the checkpoint write operation, proceeds immediately on to the next step in Block 528.

Block 528 represents the TPS 112 returning the SN to the requesting application.

Thereafter, the logic exits.

Figure 5C:
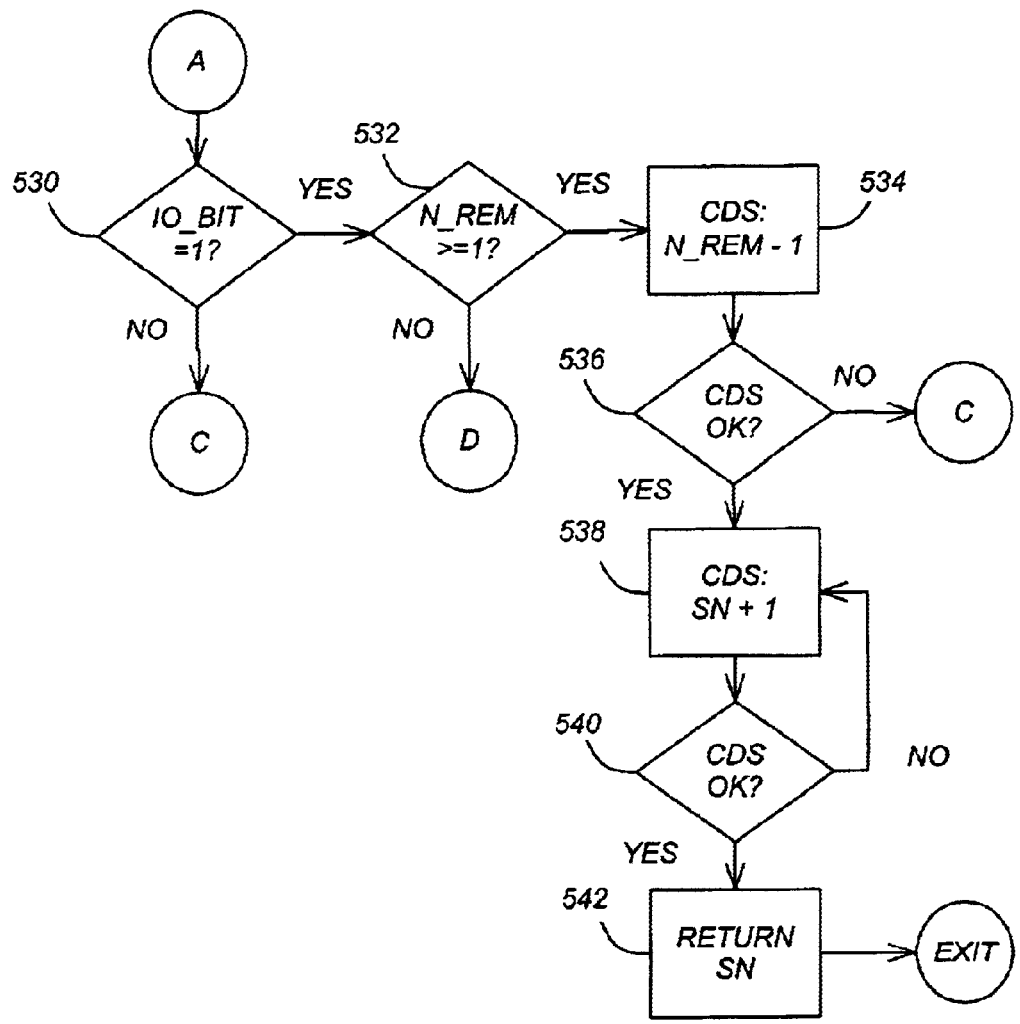

Referring to FIG. 5C, which is entered via "A", Block 530 is a decision block that represents the TPS 112 determining whether IO_BIT=1. If so, control transfers to Block 532; otherwise, control transfers to FIG. 5A via "C".

Block 532 is a decision block that represents the TPS 112 determining whether N_REM >=1. This indicates that a checkpoint write operation is in progress and the TPS 112 can continue to assign SNs. If so, control transfers to Block 534; otherwise, control transfers to FIG. 5D via "D".

Block 534 represents the TPS 112 issuing the CDS instruction to subtract 1 from N_REM.

Block 536 is a decision block that represents the TPS 112 determining whether the CDS instruction succeeded. If so, control transfers to Block 538; otherwise, control transfers to FIG. 5A via "C".

Block 538 represents the TPS 112 issuing the CDS instruction to add 1 to the SN.

Block 540 is a decision block that represents the TPS 112 determining whether the CDS instruction succeeded. If so, control transfers to Block 542; otherwise, control returns to Block 538.

Block 542 represents the TPS 112 returning the SN to the requesting application.

Thereafter, the logic exits.

Figure 5D:
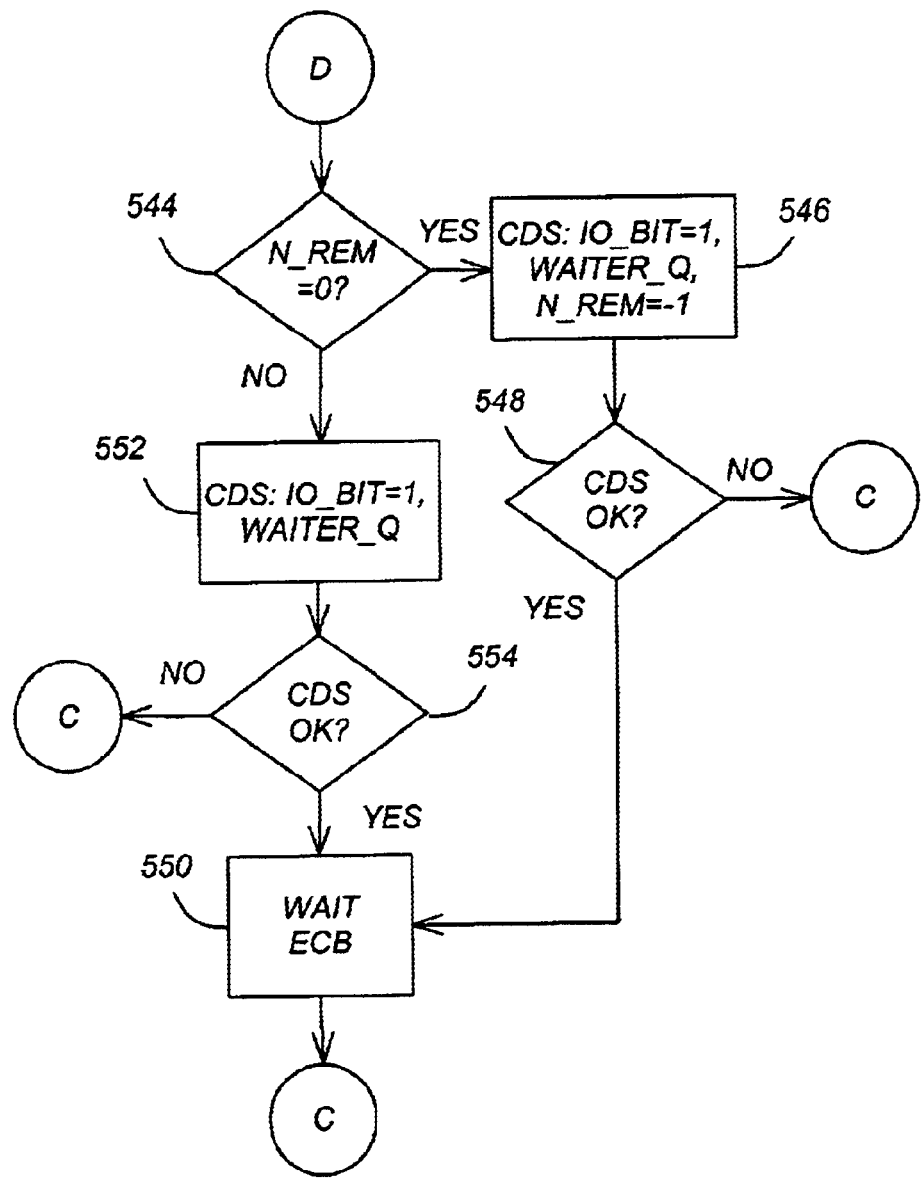

Referring to FIG. 5D, which is entered via "D", Block 544 is a decision block that represents the TPS 112 determining whether N_REM=0. This indicates that N should be set to a negative number, which is an indication for the write completion logic to self-adjust N. If so, control transfers to Block 546; otherwise, control transfers to Block 552.

Block 546 represents TPS 112 issuing a CDS instruction with IO_BIT=1, WAITER_Q, and N_REM=-1.

Block 548 is a decision block that represents the TPS 112 determining whether the CDS instruction succeeded. If so, control transfers to Block 550; otherwise, control returns to FIG. 5A via "C".

Block 550 represents TPS 112 waiting for an Event Control Block (ECB) to post, which indicates the completion of the checkpoint write operation. Thereafter control transfers to FIG. 5A via "C".

Block 552 represents TPS 112 issuing a CDS instruction with IO_BIT=1 and WAITER_Q. This indicates that the logic should suspend based on the Waiter Queue.

Block 554 is a decision block that represents the TPS 112 determining whether the CDS instruction succeeded. If so, control transfers to Block 550; otherwise, control returns to FIG. 5A via "C".

Checkpoint Write Operation Completion

FIG. 6 is a flowchart that illustrates the logic performed during completion of checkpoint write operations according to the preferred embodiment of the present invention.

Block 600 represents the TPS 112 loading the N_Word into registers.

Block 602 is a decision block that represents the TPS 112 determining whether N_REM<0. This indicates that the wait was caused due to a small N, and therefore N should be adjusted. If so, control transfers to Block 604; otherwise, control transfers to Block 614.

Block 604 represents the TPS 112 doubling N to self-adjust.

Block 606 represents the TPS 112 checkpointing the SN_Word and N via a checkpoint write operation and then waiting for the checkpoint write operation to complete. This is to checkpoint the new value of SN.

Block 608 represents the TPS 112 issuing the CDS instruction to initialize the N_REM with a new value of N, wherein IO_BIT=0 and WAITER_Q=0.

Block 610 is a decision block that represents the TPS 112 determining whether the CDS instruction succeeded. If so, control transfers to Block 612; otherwise, control returns to Block 608.

Block 612 represents the TPS 112 resuming waiters (i.e., waiting transactions) in the WAITER_Q. Thereafter, the logic terminates.

Block 614 represents the TPS 112 issuing the CDS instruction to initialize the N_REM with the N_WORD, wherein IO_BIT=0 and WAITER_Q is not specified.

Block 616 is a decision block that represents the TPS 112 determining whether the CDS instruction succeeded. If so, the logic terminates; otherwise, control returns to Block 602 via "A".

Alternative Embodiments

Alternative embodiments or extensions to the preferred embodiment are described below.

Decrementing N

In the method described above, the value of N only self-adjusts upward. It is also possible to decrease the value N to reduce the gap. One possible alternative is to decrease the value of N by observing the value in the N_Word after the checkpoint I/O operation is completed. If the value in the N_Word is greater than N/2, then N is modified to the value of N/2.

Extensions for Multi-System Transaction Processing Systems

For a multi-system TPS 112, a unique system-id could be assigned to each TPS 112 within the multi-system TPS 112. Thereafter, the SN assigned by the TPS 112 would have the system-id appended thereto. The key advantage of this solution is that no global locking is required to serialize across multiple systems to assign the SN.

Clock-Based Sequence Numbers

Another alternative would be to use a system or processor clock to assign SNs. For example, the value assigned by the STCK instruction can be used in S/390 computers sold by IBM Corporation. The STCK value is guaranteed to be unique even if two processors in a S/390 issue the STCK instruction concurrently. The SN can be made unique across multiple S/390's by appending a system-id to the SN.

Descending SNs

In the method described above, the value of SN is ascending. It is also possible that SN could be descending in alternative embodiments. For example, the SN could comprise negative values as well as positive values. Also, the SN could be incremented or decremented by values other than 1.

Other Uses for Sequence Numbers

Although the preferred embodiment describes the uses of recoverable, unique SNs with regard to transaction control in a transaction processing system, the SNs could be used in a number of different applications as well. For example, the SNs could be used to provide a recoverable, unique database variable, such as customer number, order number, product number, etc. Those skilled in the art will recognize that recoverable unique SNs have an almost unlimited number of uses.

CONCLUSION

This concludes the description of the preferred embodiment of the invention. In summary, the present invention comprises a method, apparatus, article of manufacture, and data structure for use in providing recoverable, unique serial numbers in a computer-implemented system.

The following describes some alternative ways of accomplishing the present invention. Those skilled in the art will recognize that different operating environments, transaction processing systems, database management systems, applications, etc., could be substituted for those described herein. Those skilled in the art will also recognize that the present invention could be used in any type of computer system. In addition, those skilled in the art will recognize that the present invention could be used with many types of applications, and need not be limited to the example database management and transaction processing systems described herein.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for assigning sequence numbers, comprising:
    (a) a computer system; and
    (b) sequence number assignment logic, performed by the computer system, for generating a recoverable, unique sequence number for assignment to an application when requested by the application, wherein subsequent ones of the sequence number can be assigned to applications concurrently without waiting for other applications which have been previously assigned the sequence number, and for periodically checkpointing the sequence number to a data storage device connected to the computer, wherein the checkpointed sequence number is used to initialize the sequence number assignment logic.

2. The system of claim 1 above, wherein the sequence numbers are guaranteed to be increasing across one or more failures of the computer system.

3. The system of claim 1 above, wherein the sequence numbers are monotonically-increasing.

4. The system of claim 1 above, wherein the sequence number is stored in a shared data structure in a common area of a memory of the computer.

5. The system of claim 1 above, wherein the checkpoint is performed in a protected environment, so that the checkpoint cannot be cancelled.

6. The system of claim 5 above, wherein assignment of the sequence numbers is suspended until the checkpoint completes.

7. The system of claim 5 above, wherein the checkpoint is performed every N times that the sequence number is assigned to an application.

8. The system of claim 7 above, wherein a value of N is stored in a shared data structure in a common area of a memory of the computer.

9. The system of claim 8 above, wherein the value of N is self adjusting.

10. The system of claim 8 above, wherein the value of N is adjusted to a higher value if a previous checkpoint has not completed when it is time to perform a next checkpoint.

11. The system of claim 8 above, wherein the shared data structure includes a field indicating whether a checkpoint is underway.

12. The system of claim 8 above, wherein the shared data structure includes a field identifying a queue for use in suspending applications requesting assignment of the sequence number while waiting for a checkpoint to complete.

13. A method of assigning sequence numbers in a computer-implemented system, comprising:
    (a) generating a recoverable, unique sequence number using sequence number assignment logic performed by a computer system for assignment to an application when requested by the application, wherein subsequent ones of the sequence number can be assigned to applications concurrently without waiting for other applications which have been previously assigned the sequence number; and
    (b) periodically checkpointing the sequence number to a data storage device connected to the computer, wherein the checkpointed sequence number is used to initialize the sequence number assignment logic performed by the computer system.

14. The method of claim 13 above, wherein the sequence numbers are guaranteed to be increasing across one or more failures of the computer system.

15. The method of claim 13 above, wherein the sequence numbers are monotonically-increasing.

16. The method of claim 13 above, wherein the sequence number is stored in a shared data structure in a common area of a memory of the computer.

17. The method of claim 13 above, wherein the checkpoint is performed in a protected environment, so that the checkpoint cannot be cancelled.

18. The method of claim 17 above, wherein assignment of the sequence numbers is suspended until the checkpoint completes.

19. The method of claim 17 above, wherein the checkpoint is performed every N times that the sequence number is assigned to an application.

20. The method of claim 19 above, wherein a value of N is stored in a shared data structure in a common area of a memory of the computer.

21. The method of claim 20 above, wherein the value of N is self adjusting.

22. The method of claim 20 above, wherein the value of N is adjusted to a higher value if a previous checkpoint has not completed when it is time to perform a next checkpoint.

23. The method of claim 20 above, wherein the shared data structure includes a field indicating whether a checkpoint is underway.

24. The method of claim 20 above, wherein the shared data structure includes afield identifying a queue for use in suspending applications requesting assignment of the sequence number while waiting for a checkpoint to complete.

25. An article of manufacture embodying instructions for performing a method of assigning sequence numbers in a computer-implemented system, the method comprising:
    (a) generating a recoverable, unique sequence number using sequence number assignment logic performed by a computer system for assignment to an application when requested by the application, wherein subsequent ones of the sequence number can be assigned to applications concurrently without waiting for other applications which have been previously assigned the sequence number; and
    (b) periodically checkpointing the sequence number to a data storage device connected to the computer, wherein the checkpointed sequence number is used to initialize the sequence number assignment logic performed by the computer system.

26. The method of claim 25 above, wherein the sequence numbers are guaranteed to be increasing across one or more failures of the computer system.

27. The method of claim 25 above, wherein the sequence numbers are monotonically-increasing.

28. The method of claim 25 above, wherein the sequence number is stored in a shared data structure in a common area of a memory of the computer.

29. The method of claim 25 above, wherein the checkpoint is performed in a protected environment, so that the checkpoint cannot be cancelled.

30. The method of claim 29 above, wherein assignment of the sequence numbers is suspended until the checkpoint completes.

31. The method of claim 29 above, wherein the checkpoint is performed every N times that the sequence number is assigned to an application.

32. The method of claim 31 above, wherein a value of N is stored in a shared data structure in a common area of a memory of the computer.

33. The method of claim 32 above, wherein the value of N is self adjusting.

34. The method of claim 32 above, wherein the value of N is adjusted to a higher value if a previous checkpoint has not completed when it is time to perform a next checkpoint.

35. The method of claim 32 above, wherein the shared data structure includes a field indicating whether a checkpoint is underway.

36. The method of claim 32 above, wherein the shared data structure includes a field identifying a queue for use in suspending applications requesting assignment of the sequence number while waiting for a checkpoint to complete.

37. One or more data structures stored in a common area of a computer's memory for use by sequence number assignment logic performed by the computer, the data structures comprising:
 (a) a recoverable, unique sequence number that is assigned to an application by the sequence number assignment logic whenever a request is made by an application, wherein subsequent ones of the sequence number can be assigned to applications concurrently without waiting for other applications which have been previously assigned the sequence number; and
 (b) a value of N that identifies how often the data structure is checkpointed to a data storage device connected to the computer by the sequence number assignment logic, wherein the checkpoints are performed every N times that the sequence number is assigned to an application, the checkpointed data structure is used to initialize the sequence number assignment logic performed by the computer.

38. The data structure of claim 37 above, wherein the sequence numbers are monotonically-increasing.

39. The data structure of claim 37 above, wherein the sequence numbers are guaranteed to be increasing across one or more failures.

40. The data structure of claim 37 above, wherein the checkpoints are performed in a protected environment, so that the checkpoints cannot be cancelled.

41. The data structure of claim 37 above, wherein assignment of the sequence numbers is suspended until the checkpoint is complete.

42. The data structure of claim 37 above, wherein the value of N is self adjusting.

43. The data structure of claim 37 above, wherein the value of N is adjusted to a higher value if a previous checkpoint has not completed when it is time to perform a next checkpoint.

44. The data structure of claim 37 above, wherein the shared data structure includes a field indicating whether a checkpoint is underway.

45. The data structure of claim 37 above, wherein the shared data structure includes a field identifying a queue for use in suspending applications while waiting for a checkpoint to complete.

46. A computer-implemented system for assigning sequence numbers, comprising:
 (a) a computer system; and
 (b) sequence number assignment logic, performed by the computer system, for generating a recoverable, unique sequence number by atomically reading and updating the sequence number in a common area of memory in the system, and for assigning the sequence number to one or more applications executed by the system.

47. The system of claim 46, where the sequence number is initialized from a user-specified value.

48. The system of claim 46, further comprising sequence number assignment logic for checkpointing the sequence number to a data storage device after the sequence number has been assigned N times, so as to effect a hardening of the sequence number.

49. The system of claim 48, wherein the sequence number continues to be assigned while being checkpointed.

50. The system of claim 48, wherein N is initialized to a user-specified value.

51. The system of claim 48, where the sequence number is initialized from a last checkpointed sequence number added to a gap value.

52. The system of claim 51, wherein the gap value is derived from N.

53. A method of assigning sequence numbers in a computer-implemented system, comprising:
 (a) generating a recoverable, unique sequence number by atomically reading and updating the sequence number in a common area of memory in the system; and
 (b) assigning the sequence number to one or more applications executed by the system.

54. The method of claim 53, where the sequence number is initialized from a user-specified value.

55. The method of claim 53, further comprising checkpointing the sequence number to a data storage device after the sequence number has been assigned N times, so as to effect a hardening of the sequence number.

56. The method of claim 55, wherein the sequence number continues to be assigned while being checkpointed.

57. The method of claim 55, wherein N is initialized to a user-specified value.

58. The method of claim 55, where the sequence number is initialized from a last checkpointed sequence number added to a gap value.

59. The method of claim 58, wherein the gap value is derived from N.

60. An article of manufacture embodying instructions for performing a method of assigning sequence numbers in a computer-implemented system, the method comprising:
 (a) generating a recoverable, unique sequence number by atomically reading and updating the sequence number in a common area of memory in the system; and
 (b) assigning the sequence number to one or more applications executed by the system.

61. The article of manufacture of claim 60 where the sequence number is initialized from a user-specified value.

62. The article of manufacture of claim 60, further comprising checkpointing the sequence number to a data storage device after the sequence number has been assigned N times, so as to effect a hardening of the sequence number.

63. The article of manufacture of claim 62, wherein the sequence number continues to be assigned while being checkpointed.

64. The article of manufacture of claim 62, wherein N is initialized to a user-specified value.

65. The article of manufacture of claim 62, where the sequence number is initialized from a last checkpointed sequence number added to a gap value.

66. The article of manufacture of claim 65, wherein the gap value is derived from N.

67. A data structure stored in a common area of a computer's memory for use by sequence number assignment logic performed by the computer, the data structure storing a recoverable, unique sequence number that is generated by atomically reading and updating the sequence number in the common area of memory in the system, wherein the sequence number is assigned to one or more applications executed by the system.

68. The data structure of claim 67, where the sequence number is initialized from a user-specified value.

69. The data structure of claim 67, wherein the sequence number is checkpointed to a data storage device after the sequence number has been assigned N times, so as to effect a hardening of the sequence number.

70. The data structure of claim 69, wherein the sequence number continues to be assigned while being checkpointed.

71. The data structure of claim 69, wherein N is initialized to a user-specified value.

72. The data structure of claim 69, where the sequence number is initialized from a last checkpointed sequence number added to a gap value.

73. The data structure of claim 72, wherein the gap value is derived from N.

* * * * *